UNITED STATES PATENT OFFICE.

WILLIAM DAVID JOHNSTON, OF SAN FRANCISCO, CALIFORNIA.

METHOD OF ABSTRACTING GOLD AND SILVER FROM THEIR SOLUTIONS IN POTASSIUM CYANIDES.

SPECIFICATION forming part of Letters Patent No. 522,260, dated July 3, 1894.

Application filed November 20, 1893. Serial No. 491,473. (No specimens.)

*To all whom it may concern:*

Be it known that I, WILLIAM DAVID JOHNSTON, a citizen of the United States, residing in the city and county of San Francisco, State of California, have invented an Improvement in Methods of Abstracting Gold and Silver from their Solutions in Potassium Cyanide; and I hereby declare the following to be a full, clear, and exact description of the same.

Heretofore when solutions of gold and silver have been made in potassium cyanide, the metals have been recovered from their solution, by the use of zinc in various forms.

The object of my invention is to recover the metals in a shorter time, and more economically, by the use of pulverized carbon, preferably in the form of charcoal.

To carry my invention into effect, I take carbon in a pulverized form as above, and place it upon suitable supports so as to form it into filters through a series of which the cyanide liquid is caused to pass successively, leaving the metal deposited upon the carbon. The gold and silver are then recovered from the carbon by carefully burning the carbon, and smelting the residue with the usual fluxes. By thus employing a series of filters through which the solution is passed successively, I am able to recover upward of ninety-five per cent. of the precious metal contained in the solution.

When only one filter is employed, only about one-fourth of the gold can be extracted.

Having thus described my invention, what I claim as new, and desire to secure by Letters Patent, is—

1. The process of abstracting gold and silver from their solution in potassium cyanide, consisting in passing the liquid through a series of carbon filters within which the gold is arrested, substantially as described.

2. The process of abstracting gold and silver from their solution in potassium cyanide, consisting in passing the liquid through a series of carbon filters within which the gold is arrested, and then recovering the metal by burning the carbon and smelting the residue with suitable fluxes, substantially as described.

In witness whereof I have hereunto set my hand.

WILLIAM DAVID JOHNSTON.

Witnesses:
S. H. NOURSE,
H. F. ASCHECK.